United States Patent [19]

Corbett et al.

[11] Patent Number: 4,508,741

[45] Date of Patent: Apr. 2, 1985

[54] COATED PET FOOD AND PROCESS FOR PREPARATION THEREOF

[75] Inventors: Colin D. Corbett, El Paso, Tex.; Robert L. Milloch, Garden Grove; Felicisimo S. Sarno, Cerritos, both of Calif.

[73] Assignee: Star-Kist Foods, Inc., Terminal Island, Calif.

[21] Appl. No.: 418,239

[22] Filed: Sep. 15, 1982

[51] Int. Cl.$^3$ .............................................. A23K 1/00
[52] U.S. Cl. .................... 426/303; 426/512; 426/523; 426/623; 426/630; 426/646; 426/805
[58] Field of Search ............ 426/93, 92, 94, 99, 426/293, 303, 305, 512, 523, 549, 623, 630, 646, 805, 641

[56] References Cited

U.S. PATENT DOCUMENTS

| | | |
|---|---|---|
| 3,119,691 | 1/1964 | Ludington et al. .............. 426/293 X |
| 3,467,525 | 9/1969 | Hale et al. . |
| 3,615,647 | 10/1971 | Kassens ................................. 426/92 |
| 3,808,340 | 4/1974 | Palmer et al. . |
| 3,808,341 | 4/1974 | Rongey et al. . |
| 3,922,353 | 11/1975 | Bernotavicz . |
| 3,930,031 | 12/1975 | Kealy . |
| 3,959,511 | 5/1976 | Balaz et al. . |
| 3,968,255 | 7/1976 | Haas et al. . |
| 4,029,821 | 6/1977 | Munro ............................ 426/805 X |
| 4,045,585 | 8/1977 | Appleman et al. ............. 426/805 X |
| 4,229,485 | 10/1980 | Brown et al. . |
| 4,366,175 | 12/1982 | Brown et al. . |

FOREIGN PATENT DOCUMENTS

| | | |
|---|---|---|
| 473704 | 10/1937 | United Kingdom . |
| 1359901 | 7/1974 | United Kingdom . |
| 1389578 | 4/1975 | United Kingdom . |
| 1412772 | 11/1975 | United Kingdom . |
| 1433657 | 4/1976 | United Kingdom . |
| 1465267 | 2/1977 | United Kingdom . |

Primary Examiner—R. B. Penland
Attorney, Agent, or Firm—Fulwider, Patton, Rieber, Lee & Utecht

[57] ABSTRACT

A nutritious dry food for feeding to pets, wherein a farinaceous-based core is covered by a primary coating containing farinaceous material and a relatively small amount of proteinaceous material to provide flavor and texture, and is further covered by a secondary coating containing an ingredient such as starch or egg to impart a sheen to the surface of the finished pet food. In a preferred form, the core includes a majority by weight of ground uncooked wheat and additionally meat and bone meal, the primary coating includes cracked oat groats and a small amount of liver or meat, and the secondary coating includes starch to give the final dried product a shiny, glistening appearance.

14 Claims, No Drawings

COATED PET FOOD AND PROCESS FOR PREPARATION THEREOF

BACKGROUND OF THE INVENTION

This invention relates generally to pet foods, and more particularly, to a dry pet food product that is nutritious for the animal and presents a desirable appearance to the consumer, yet is consistently and economically prepared in commercial operations.

Pet foods are generally manufactured and available in dry, moist, and semi-moist formulations. Moist pet foods, having a moisture content of about 50 percent or greater, are typically prepared from proteinaceous materials such as meat, meat by-products or fish. Such high-moisture pet foods are usually appealing to the animals, but suffer fromm disadvantages of high production cost and a potential for biological instability (spoilage), so that high-moisture pet foods are packaged in cans and must be consumed relatively soon after the containers are opened. Semi-moist products, which typically contain about 15 to 50 percent moisture, are formed from a combination of farinaceous materials, such as wheat or other grains, and proteinaceous materials. The products also contain flavorings and moisture to improve the palatability. However, semi-moist foods also suffer from potential biological instability, requiring sealed packaging such as foil pouches, and such products also must be consumed relatively soon after the container is opened.

Dry pet foods, which typically contain less than about 15 percent moisture, are formed primarily from farinaceous materials, and may contain small amounts of proteinaceous material and flavorings to improve palatability, as well as nutrients to ensure a proper diet for the animal. While dry pet foods have excellent biological stability and can be packaged in bulk containers that need not be used immediately after opening, such dry pet foods also are often relatively low in palatability for the animal and low in perceived attractiveness to the consumer who purchases the product.

Several approaches for improving the palatability and consumer appeal of dry pet foods have been undertaken. In one, the dry pet food is coated with gravy-forming ingredients, so that when water is added a thick gravy is formed. In another approach the dry farinaceous core is covered with a coating of a moist proteinaceous material to mask the core. However, such products suffer from many of the disadvantages inherent in high moisture products. In yet another approach, as described in U.S. Pat. No. 4,229,485, a farinaceous core is covered with a coating of slurried liver, which is then dried on the surface of the core to improve the palatability of the final product and to impart a sheen to the product, which is desirable to the consumer. In such liver-coated dry pet food products, it has been found necessary that the liver content should exceed about 50 percent by weight of the coating so that the final dried product has the desired sheen.

Although the liver coated dry pet food product described in U.S. Pat. No. 4,229,485 has proved successful commercially, it suffers from several disadvantages. The appearance of the product can vary from batch to batch due to variations in the liver quality and minor processing variations. The relatively high lever content necessary to produce the sheen necessitates a high formulation cost, and a high production cost due to relatively long drying times to reduce the moisture content of the coating to a level which will not support biological instability. Further, the desirable surface sheen is obtained only with a liver coating, and not for many other possible proteinaceous ingredients. Accordingly, there has been a need for a pet food product having the inherent advantages of dry pet foods and the improved appearance and palatability of a liver-coated dry pet food, yet allowing low cost, consistent preparation from batch to batch using a variety of proteinaceous ingredients. The present invention fulfills this need and further provides related advantages.

SUMMARY OF THE INVENTION

The present invention provides a dry pet food product, and process for preparation thereof, having excellent palatability and nutritional value for the animal, and presenting to the consumer a desirable sheen on its surface. Two coatings applied over a primarily farinaceous core provide a textured, highly palatable product for the animal, and a sheen is imparted independent of the formulation of the proteinaceous material covering the core. With this invention, a dry pet food that is palatable and highly nutritional for the animal and of a desirable sheen for the consumer may be consistently prepared at low cost on a commercial scale.

In accordance with the invention, the pet food product comprises a primarily farinaceous core of desired shape covered with a primary coating including proteinaceous materials, and a secondary coating including an ingredient which imparts a desirable sheen to the final product. In a preferred embodiment of the invention, the core comprises a mixture of ground wheat and meat and bone meal, with nutrients and flavorings added. The primary coating comprises a mixture of oat groat to provide a surface texture, beef or liver for flavor, and colorants and additional flavoring agents. The secondary coating, which provides the desirable surface sheen, includes starch or egg and a colorant.

The final product is prepared by mixing and shaping the core, and applying the primary coating and then the secondary coating to the core. In a preferred process, the core ingredients are mixed with water and shaped into the form of a dog bone about 2–4 inches in length, and the ingredients of the primary coating mixed with water are applied to the core by enrobing immediately before the core enters a baking oven. As the cooked core and primary coating emerge from the baking oven, the secondary coating is applied as a water-based spray, and the final product is air or oven dried.

It is be appreciated that the foregoing represents an advance in dried pet food products. With this invention, a nutritious, palatable product having a desirable surface sheen may be prepared on a commercial basis with minimal variation in content and appearance from batch to batch. Other features and advantages of the present invention will become apparent from the following more detailed description.

DETAILED DESCRIPTION OF THE PREFERRED EMBODIMENT

The present invention is embodied in a dried pet food having a core or base composed primarily of a farinaceous ingredient. The farinaceous ingredient is mixed with other core ingredients and water to make a dough, and pieces of this dough are formed into the shape of the final product. Any suitable shaping means may be employed, and in the preferred embodiment the pieces of dough are formed by pressing into cavities of a mold. The mold can produce pieces of any desired configuration, and in the preferred embodiment the pieces of dough are formed into dog bone-shaped pieces approximately 2 inches in length, for feeding to smaller animals, or approximately 4 inches in length, for feeding to larger animals. The mixing of the dough and molding into pieces may be performed continuously in a commercial-scale operation.

The core is formed primarily of farinaceous material, preferably uncooked cereal grains such as ground uncooked wheat, corn, oats, milo, barley, rice, or flours or other processed products produced from such cereal grains. Other less common farinaceous materials such as potatoes and tapioca may be also utilized. The farinaceous material provides an inexpensive yet nutritious base for the core of the food. Additionally, other core ingredients may be mixed into the farinaceous dough, including flavorings, nutrients, preservatives or facilitators of the forming and cooking operations. For example, proteinaceous materials such as meat, meat by-products, organ tissue, fish or the like may be added as flavor enhancers and nutrients. Animal fat or other animal derivatives may be added for flavoring. Salt may be added as a flavoring and preservative. A vitamin and mineral concentrate may be added in small amount to the dough to ensure that the pet food provides an acceptable level of nutrition to the animal. Chemical additives such as antioxidants to prevent oxidation of the final product and antimycotics to act as preservatives and mold inhibitors may also be added to the product, in an amount sufficient to prevent oxidation, mold and bacterial growth before the pet food is consumed. Examples of such additives commonly used in the food industry include antioxidants such as butylated hydroxytoulene, butylated hydroxyanisole, and the like, and antimycotics such as sodium benzoate, calcium propionate, potassium sorbate, and the like. Other desirable additives can be made to enhance the molding and cooking operations, such as wheat gluten to give cohesiveness to the dough and oils to enhance the baking and release of the dough from the mold. As is well known in the cooking arts, doughs formed from farinaceous ingredients readily accept a wide variety of other ingredients and additives, and the above listing is intended to be illustrative rather than exhaustive.

In accordance with the invention, two coatings are applied to the core to enhance its flavor and appearance. Since the surface of the pet food is presented to the consumer and the senses of the animal during feeding, flavor and appearance enhancers have their most direct and economical effect when utilized in such coatings. In the present invention, the primary coating provides a texture to the surface of the pet food and includes ingredients giving an appealing flavor, aroma and color to the pet food. The secondary coating includes an ingredient such as starch or beaten eggs to provide a sheen to the final surface of the final product.

The primary coating is preferably prepared as a mixture of farinaceous, proteinaceous and other ingredients in water and applied to the uncooked core immediately prior to the cooking operation. The primary coating is applied to the uncooked core by enrobing, a process wherein the uncooked core is placed on a wire mesh belt and moved past an applicator while the primary coating mixture is discharged from the applicator head as a stream covering the uncooked cores. Excess primary coating mixture falls through the wire mesh, to be recovered and conducted to the applicator head for reapplication. Although the exact amount of primary coating is not critical, it has been found that an acceptable product is obtained when the undried primary coating weight is about 16% of the weight of the uncooked core. In the enrobing process, the uncooked core typically is not entirely coated with the primary coating, but instead the bottom portion of the core in contact with the wire mesh is left partially uncoated. Since proper functioning of the coating does not require complete coverage, such partial coverage is acceptable in processing.

The primary coating desirably contains a farinaceous ingredient to give texture to the surface of the animal food product, a proteinaceous ingredient for flavor, additional ingredients acting as seasonings or flavorings, colorants, and antioxidants or antimycotics to preserve the animal food product prior to consumption. A particularly desirable surface texture may be provided by simulating the roughened surface appearance of meaty animal food products. To simulate such an appearance, partially ground farinaceous materials may be applied to the core as part of the primary coating. When mixed with the other ingredients of the primary coating, and after cooking, the unprocessed farinaceous ingredient gives a textured or "bumpy" surface on the product. Dehulled, cracked oats, known as oat groats, is a particularly effective texturizing additive, but other texturizers such as texturized vegetable protein may also be utilized.

Proteinaceous materials such as meat, meat by-products, or fish are added to the primary coating as flavorants. In the prior U.S. Pat. No. 4,229,485, a product was described wherein a single coating was applied to a core, and the coating was limited to a liver content greater thn 50%. The present invention makes no comparable restriction on the type or percentage of proteinaceous ingredients in the primary coating. Therefore, in the present invention a wide variety of types and percentages of proteinaceous material may be added to the primary coating to achieve the objective of improved flavoring. As meat, any boneless beef, pork, veal, lamb, poultry or fish, either fresh or frozen may be used. Thus, the term "meat" is understood not only to apply to the flesh of cattle, swine, sheep and goats, but also the horses, whales and other mammals, poultry and fish. The term "meat by-products" refers to those nonrendered parts of the carcasses of slaughtered animals, including but not restricted to mammals, poultry and the like, and including such constituents as liver, kidney, heart, spleen, tongue, trimmings, lungs and skins, embraced by the term "meat by-product", in the *Definition of Feed Ingredients* published by the Association of American Feed Control Officials, Inc. Additionally, other ingredients may be used to enhance the flavor and aroma of the final product, including ingredients long known in the animal feed art to be desirable, such as garlic powder, onion powder, and salt for flavoring, and "Charoil," a product of Red Arrow Products Co., Manitowoc, Wisconsin, to provide a smokey aroma. Desirably, a colorant is also added to the primary coating to provide a color in the final product characteristic of a meat containing product. Such colorants are well known in the art, and include colorants such as caramel coloring and FD&C (Food, Drug and Cosmetics) red #40 dye.

The process to prepare the primary coating for application to the core is dependent upon its exact formulation. The approach used in the preferred embodiment will be described below in relation to the specific examples provied herein, but generally the primary coating is prepared by cooking the farinaceous ingredient and the other ingredients, exclusive of the proteinaceous ingredient, in water to achieve a desirable consistency, and then adding the proteinaceous ingredients in a finely comminuted form and continuing the cooking for a short time. The coating mixture is then ready for application to the core.

As indicated previously, in the preferred embodiment, the primary coating is added to the uncooked core by an enrobing process immediately preceding entry of the core into a cooking oven. The core enrobed with the primary coating then passes through a cooking oven operating at 350°–600° F., with a residence time sufficient to cook and dry the coated core, and typically from about one hour to about 5 minutes. In the oven the ingredients are cooked and the total moisture content of the core and primary coating is reduced to below about 15 percent by weight. Alternatively, the core may be cooked, and the primary coating may be applied prior to a second cooking.

A secondary coating is applied over the primary coating on the core to impart a sheen to the final product, so that the final product has a desirable, moist, shiny and glossy appearance. The secondary coating may be applied over the primary coating with the core and primary coating either hot or cold. Preferably the application is made with the core and primary coating hot so that moisture in the secondary coating is evaporated without the need for additional heating or cooking, thereby saving energy and reducing capital costs for the production line. Alternatively, the secondary coating may be applied cold, and excess moisture may be dried by heat lamps or an oven. The secondary coating is formulated from an ingredient which imparts a sheen to the surface after drying the pet food. A mixture of starch in water, with a colorant such as FD&C red #40, caramel, or both added, has been found most preferable. Alternatively, a mixture of 50 percent beaten whole egg in water with colorant added has also been found acceptable. In the preferred embodiment using starch, the starch and colorant are added to water and brought to a boil until the starch is cooked. The secondary coating is preferably applied to about 3–4 percent by weight of the final product (before the secondary coating is dried), but the amount of secondary coating may range from about 1 percent to about 25 percent, although the amount is not critical as long as the desired surface appearance is obtained.

The following specific examples, in which all percentages are by weight, will serve to illustrate the ingredients and preparation procedure of the presently preferred embodiment of the invention:

EXAMPLE 1

The following ingredients are blended to form a dough for the core:

| Ingredient | % |
|---|---|
| Ground uncooked wheat | 54.95 |
| Meat and bone meal | 8.23 |
| Salt | 1.46 |
| Potassium sorbate | 0.02 |
| Animal fat | 1.83 |
| Vitamin and mineral prefix | 0.10 |
| Corn gluten | 3.66 |

| -continued | |
|---|---|
| Ingredient | % |
| Water | 29.75 |
| | 100.00% |

Pieces of the dough are placed into a mold and shaped into bones approximately 4 inches long. The uncooked bone-shaped pieces are placed on an endless wire mesh conveyor belt for the subsequent enrobing process.

The primary coating is prepared from the following ingredients:

| Ingredient | % |
|---|---|
| Oat groat (cracked) | 10.42 |
| Beef or meat | 8.69 |
| Garlic powder | 0.02 |
| Onion powder | 0.04 |
| Charoil (smoke aroma) | 0.17 |
| Potassium sorbate | 0.05 |
| Salt | 0.61 |
| FD & C Red #40 and caramel colorants | 0.07 |
| Water | 79.93 |
| | 100.00% |

The primary coating is prepared by placing all of the ingredients except the beef into a steam-jacketed kettle and mixing with vigorous stirring. The mixture is brought to a boil and held until the oat groat is cooked, a time of approximately thirty minutes. The steam is then turned off, and the beef is added. The mixture is then pumped into the enrober for coating.

A secondary coating is prepared from the following ingredients:

| Ingredient | % |
|---|---|
| Polargel 8 starch | 3.38 |
| Water | 96.59 |
| FD & C Red #40 and caramel colorants | 0.03 |
| | 100.00% |

The ingredients are placed into a steam-jacketed kettle and mixed together under vigorous stirring. The mixture is brought to a boil and held at the boiling point until the starch is cooked, a time of approximately 15–20 minutes. The cooked starch mixture is then pumped into a spray tank for subsequent application.

To prepare the animal food product, the uncooked core is placed on an endless wire mesh conveyor belt and moved through an enrober wherein approximately 16 percent by weight primary coating is applied to the core. The primary coating-covered core then enters a 150 foot long continuous baking oven held at 500° F., with the speed of the belt adjusted to maintain a residence time in the oven of approximately 17 minutes. After the cooked core and primary coating emerge from the baking oven, the secondary coating is sprayed onto the bone's surface so that the secondary coating is about 3–4 percent by weight of the final product, before the secondary coating is dried. The moisture in the secondary coating is dried by the heat retained in the hot bone following the prior cooking step, so that no further cooking or heating is required. Using this preparation procedure, the final composition of the animal food product is found to be approximately:

| Ingredient | % of Dry Bone |
|---|---|
| CORE: | |
| Ground uncooked wheat | 75.97 |
| Meat and bone meal | 11.39 |
| Salt | 2.03 |
| Potassium sorbate | 0.03 |
| Animal fat | 1.01 |
| Vitamin and mineral prefix | 0.14 |
| Corn gluten | 5.06 |
| PRIMARY COATING: | |
| Oat groat | 2.68 |
| Beef meat | 1.12 |
| Garlic powder | 0.01 |
| Onion powder | 0.01 |
| Charoil (smoke aroma) | 0.04 |
| Potassium sorbate | 0.01 |
| Salt | 0.16 |
| FD & C Red #40 and caramel colorants | 0.11 |
| SECONDARY COATING: | |
| Polargel 8 starch | 0.14 |
| Water | 0.08 |
| FD & C Red #40 and caramel colorants | 0.01 |
| | 100.00% |

The final product is readily consumed by dogs in feeding tests, and has a surface sheen which appeals to consumers who purchase and feed the product.

EXAMPLE 2

Example 1 is repeated, except that beef liver is substituted for beef meat in the primary coating, but in the same percentage, and except that caramel is the only colorant added. The results are substantially the same, except that the primary coating contains liver rather than meat.

EXAMPLE 3

Example 1 is repeated, except that the secondary coating is prepared from the following ingredients:

| Ingredient | % |
|---|---|
| Raw egg | 49.99 |
| Water | 49.98 |
| FD & C Red #40 and caramel colorants | 0.03 |
| | 100.00 |

The ingredients of the secondary coating are placed in a kettle and mixed together under moderate stirring. The mixture is then pumped into a spray tank for subsequent application.

In other respects, the animal food product of Example 3 is prepared in the same manner as that of Example 1, with substantially the same results except for minor variations in the final dry percentages of ingredients. The egg constitutes about 0.59% by weight of the final product.

Although a particular embodiment is described in detail for purposes of illustration, various embodiments can be made without departing from the spirit or the scope of the invention. Accordingly, the invention is not to be limited except as by the appended claims, wherein all percentages are expressed by weight.

We claim:

1. A process for preparing a dry pet food product, comprising the steps of:

forming an edible core, the core including at least some farinaceous material;

applying a primary coating to the core, the primary coating having a proteinaceous component in an amount less than 50 percent of the total dry weight of the primary coating; and applying a secondary coating over the primary coating on the core, the ingredients of the secondary coating being selected to produce a moist shiny and glossy appearance on the product after drying.

2. The process of claim 1, wherein the secondary coating comprises a mixture of starch and water before drying.

3. The process of claim 1, wherein the secondary coating comprises a mixture of from about 1 to about 25 percent starch in water before drying.

4. The process of claim 1, wherein the secondary coating comprises a mixture of beaten eggs and water before drying.

5. The process of claim 1, including the further step of:

cooking the core and primary coating; after said step of applying a primary coating.

6. The process of claim 1, including the further step of:

drying the pet food; after said step of applying a secondary coating.

7. The process of claim 1, wherein the primary coating comprises cracked oat groats and beef meat.

8. The process of claim 1, wherein the primary coating comprises cracked oat groats and liver.

9. The process of claim 1, wherein the core comprises a mixture of ground uncooked wheat and meat and bone meal.

10. The process of claim 1, wherein the core is formed in the shape of a bone.

11. A process for preparing a dry pet food product, comprising the steps of:

forming an edible core into the shape of a bone, the core comprising a mixture of wheat and meat and bone meal;

applying to the core a primary coating comprising a mixture of cracked oat groats and beef;

cooking the core and primary coating;

applying to the cooked core and primary coating a secondary coating comprising a mixture of starch and water; and drying the secondary coating to produce a product having a moist, shiny and glossy appearance.

12. The process of claim 11, wherein the secondary coating includes starch in the amount of about 1 to about 25 percent before drying.

13. A process for preparing a dry pet food product, comprising the steps of:

forming an edible core into the shape of a bone, the core comprising a mixture of wheat, meat and bone meal;

applying to the core a primary coating comprising a mixture of cracked oat groats and liver;

cooking the core and primary coating;

applying to the cooked core and primary coating a secondary coating comprising a mixture of starch and water; and drying the secondary coating to produce a product having a moist shiny and glossy appearance.

14. The process of claim 13, wherein the secondary coating includes starch in the amount of about 1 to about 25 percent before drying.

* * * * *